_United States Patent Office_

3,449,250
Patented June 10, 1969

3,449,250
DISPERSENCY OIL ADDITIVES
Joseph E. Fields, Ballwin, Mo., assignor to Monsanto Company, St. Louis, Mo., a corporation of Delaware
No Drawing. Original application May 14, 1962, Ser. No. 194,669, now Patent No. 3,329,658 dated July 4, 1967. Divided and this application Apr. 25, 1967, Ser. No. 647,272
Int. Cl. C10m 1/36, 3/30; C10l 1/22
U.S. Cl. 252—51.5                               15 Claims

ABSTRACT OF THE DISCLOSURE

A hydrocarbon oil composition which comprises a major amount of a mineral oil and a minor amount of a copolymer which imparts stability and detergency to the mineral oil. The copolymer has a molecular weight in the range of about 500 to 150,000 and is formed of substantially equimolar portions of maleic anhydride and alpha-olefins such as ethylene, propylene, isobutylene, or styrene. The carboxyl groups of the copolymers are esterified with an aliphatic alcohol to make the copolymer oil soluble and substantially all of the remainder of the carboxyl groups are imidized.

---

This application is a division of my copending application Ser. No. 194,669, filed May 14, 1962, now U.S. Patent No. 3,329,658.

This invention relates to improved dispersency or detergency additives usable in oils, and particularly to improved fuel oil and mineral lubricating oil compositions containing these additives. Other properties imparted to the oils by the new dispersency additives are color stability, oxidation resistance, pour point depressancy and viscosity index improvement.

Until recently, fuel oils and lubricating oils were generally doped with polyvalent metal salts or soaps such as polyvalent metal organic sulfonates, carboxylates, phenates, phosphates, thiocarbamates, and the like, in order to impart to the oil one or more of the above and other properties. Although some of the previously proposed classes of ash-forming additives are good anti-clogging agents in fuel oils, they are readily leached out by water, and they lack the property of inhibiting oxidation or color deterioration of the oil during use or storage. Lubricating oil containing various proposed ash-forming additives, such as polyvalent metal organic sulfonates, lack desired cold temperature detergent properties and the additive is depleted rapidly during use.

It has now been found that certain physical as well as some chemical properties of the heavier than gasoline liquid hydrocarbons such as fuel oil and lubricating oil are markedly improved by the use of certain oil-soluble polymeric compounds. The copolymers which are the basis for the compounds are formed of substantially equimolar portions of maleic anhydride and an alpha-olefin which is ethylene, propylene, isobutylene, styrene or a mixture of these olefines. These copolymers should have a molecular weight in the range of about 500 to about 150,000, and for the ethylene-maleic anhydride copolymers this is equivalent to a specific viscosity in the range of about 0.05 to about 3.0 at 1% by weight concentration in dimethylformamide at 25° C., to be useful, preferably in the range of about 0.05 to about 2.0. The carboxyl groups of the copolymer must be esterified with at least a sufficient amount to provide oil solubility, preferably at least about 30% but not more than about 95%, of aliphatic alcohol or mixture of alcohols having from about 10 to about 20 carbon atoms. The detergency is provided for the compound by reacting substantially all of the balance of the carboxyl groups with a compound of the formula

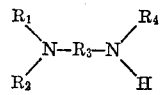

where $R_1$ and $R_2$ are selected from the group consisting of aliphatic hydrocarbon radicals having from 1 to 4 carbon atoms and the cyclohexyl radical, $R_3$ is an aliphatic hydrocarbon radical having from 2 to 4 carbon atoms, and $R_4$ is selected from the class consisting of the hydrogen atom and aliphatic hydrocarbon radicals having from 1 to 4 carbon atoms.

Where high detergency is important it is preferred to react about 20% to about 50% of the carboxyl groups with the detergency compound; however, with styrene/maleic anhydride copolymer it is preferred to react about 5% to about 40% of the carboxyl groups with the detergency compound.

The detergency for the additives is provided by the compound of the formula

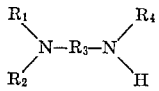

An illustrative listing of the polyamines of this type is:

N,N-dimethyl-1,2-ethylenediamine;
N-methyl-N-ethyl-1,2-propylenediamine;
N,N-dimethyl-1,3-propylenediamine;
N,N-diethyl-1,3-propylenediamine;
N,N-dipropyl-1,3-propylenediamine;
N-propyl-N-methyl-1,3-propylenediamine;
N,N-diisopropyl-1,3-propylenediamine;
N,N-dibutyl-1,3-propylenediamine;
N,N-diisobutyl-1,3-propylenediamine;
N,N-(di-t-butyl)-1,3-propylenediamine;
N,N,N'-trimethyl-1,3-propylenediamine;
N,N-dimethyl-N'-ethyl-1,3-propylenediamine;
N,N-dimethyl-N'-1,3-propylenediamine;
N,N-dimethyl-1,2-isopropylenediamine;
N,N-dimethyl-1,4-butylenediamine;
N,N-diethyl-2,3-butylenediamine;
N,N-dimethyl-1,3-isobutylenediamine;
N,N-dimethyl-1,3-butylenediamine;
N,N-dimethyl-1,3-t-butylenediamine;
N,N-dicyclohexyl-1,3-propylenediamine;
N,N-dicyclohexyl-1,2-ethylenediamine, etc.

Of the polyamine compounds listed above the primary amines are preferred.

The hydrocarbon oils which are improved most by the incorporation of polymeric additives of this invention are those of the heavier than gasoline hydrocarbon and preferably those which have an initial boiling point of around 500° F., including various fuel oils and lubricating oils, particularly distillate fuel oils such as treated or untreated cracked fuel oils or mixtures of cracked and straight run fuel oils, which oils usually have components normally distilling at about 500° F. and have an end distillation point around 750° F. Fuel oils of this type include numbers 1, 2 and 3 fuel oils, gas oils, furnace oil, burner oils, diesel fuel oils, kerosene or mixtures thereof. However, gasoline will also benefit somewhat by the use of the polymeric amine additives and in fact any liquid hydrocarbon can benefit therefrom as to detergency. Lubricating oils may be obtained from paraffinic, naphthenic, asphaltic, or mixed base crude oils, as well as mixtures thereof. The viscosity of these oils can vary over a wide range, such as from 50 SUS at 100° F. to 150 SUS at 210° F. The lubricating oils can be blended with fixed oils such as castor oil, lard oil, and the like, and/or with synthetic lubricants such as polymerized olefins, the polyalkylene glycols, and alkylene oxides, organic esters, especially the polyesters, e.g., 2-ethylhexyl sebacate, dioctylphthalate, trioctyl phosphate; polymeric tetrahydrofuran, polyalkyl, polysiloxane (silicones), e.g., dimethyl silicone polymer, and the like.

The method of making the copolymers and the esterification amidation or imidation thereof using alcohol or amines is quite adequately broadly described in the prior art in U.S. 2,615,845 and the teachings of this patent are incorporated herein by reference. The polyamine amides or imides or alcohol amines are made in a similar manner, as will be illustrated by specific examples hereinbelow. The additives of U.S. 2,615,845 are particularly useful as pour point depressants and viscosity index improvers but not as detergents. As will be indicated by the specific examples described in detail below, the additives of the invention are not only good low temperature detergents but good high temperature detergents as well. This is very surprising and unexpected since many good high temperature detergents are not at all satisfactory as low temperature detergents. The additives when used as low temperature detergents, of course, function particularly to inhibit sedimentation in furnace oils and the like and lubricating oils for stop and go driving where the oil never has an opportunity to become warm. In the case of the lubricating oil the high temperature detergency properties are required for steady driving on longer trips.

The invention will be better understood from a consideration of the following examples:

EXAMPLE 1

This example illustrates the preparation of a typical additive of the invention. First the ethylene-maleic anhydride (EMA) copolymer is prepared. The particular copolymer described in this example has a specific viscosity of about 0.1, the specific viscosity being determined in a 1% by weight concentration of the polymer in dimethylformamide at 25° C. A 300 p.s.i.g. 50 gallon "Glascote" reactor fitted with auxiliary equipment for temperature control, reflux, liquid reactant addition, stirrer, and ethylene gas feed was used. The reactor was charged with 355 pounds of ethylene dichloride, 50 pounds of moleic anhydride, and 5.75 pounds of n-butyraldehyde as a chain stopper. The reactor was purged twice with ethylene to rid the system of oxygen and brought to operating conditions (80° C. and 200 p.s.i.g.) under ethylene pressure. Catalyst, 840 grams of benzoyl peroxide in 20 pounds of ethylene dichloride, was added. The reaction proceeded for 10½ hours with the pressure being maintained at 200 p.s.i.g. by added ethylene. The product slurry was drained and filtered to remove most of the ethylene dichloride, then dried. Yield was 56.6 pounds of 0.094 specific viscosity polymer (the specific viscosity being determined as described above in this example). All specific viscosities reported throughout this application were determined in this manner, i.e. on a 1% by weight concentration of the polymer in dimethylformamide at 25° C.

A sample of 1260 grams of the copolymer, 3600 g. of alcohol No. 1 described in Table I, 300 ml. of xylene, and 4 ml. of 85% phosphoric acid were added to a 12 liter-3 neck flask with stirrer, thermometer, and reflux condenser over a Dean-Stark water-takeoff for azeotropic distillation and water removal. The heating and stirring of the reaction mixture was begun and the solids all went into the solution at about 160° C. The heating and stirring was continued under reflux withdrawing water of esterification as formed and the temperature was gradually raised from 160 to 200° C. over a period of 6 hours during which time a total of 164 ml. of water was removed and a total of 675 ml. of xylene was added to maintain reflux at about 200° C. The course of the esterification was followed by acid number determinations on aliquot samples from the flask. After two hours 69% of the carboxyl groups had been esterified, after 3¾ hours 74%, and after 6 hours 81%. At the end of the 6 hour period the reaction mixture was cooled to 160° C. during which time 900 ml. of xylene were added to maintain reflux at a temperature of 160° C. At 160° C. over a period of about ½ hour there were added 435 g. (4 mols) of 95% pure N,N-dimethyl-1,3-propylenediamine. The reaction mixture was then allowed to reflux at 167 to 170° C. for 12 hours during which time 89 ml. of water were collected. Then the exylene solvent and excess amine or alcohol were removed by vacuum distillation until a final pot temperature of 205° C. at 5 mm. of Hg was reached. The residue product in the flask weighed 3730 g. The product was then diluted with 3730 g. of base oil No. 1 to give a 50% concentration of the esterimide product. The diluted product analyzed 1.43% nitrogen which is equivalent to a product containing 61% ester and 39% imide.

An exact duplicate of the above run was carried out yielding 3754 g. of residue product and this was diluted to 50% concentration with No. 1 base oil. This product analyzed 1.3% nitrogen which is equivalent to 64% ester and 36% imide. The two samples were then blended and the blended sample analyzed 1.36% nitrogen which is equivalent to 62% ester and 38% imide. This blended product had an acid number of 1.08.

Base oil No. 1

The base oil used to dilute the product of Example 1 is characterized as base oil No. 1 and was a solvent refined mid-continent oil having the following properties:

Viscosity at 210° F _____ centistokes__ 3.94
Viscosity at 100° F _____ do____ 21.58
Viscosity index _____ 75.3
Specific gravity 25°/25° C _____ 0.886
Flash point, Cleveland open cup _____ °F__ 375

Base oil No. 2

This oil is a solvent refined mid-continent oil base stock having the following properties:

Viscosity at 210° F _____ centistokes__ 10.39
Viscosity at 100° F _____ do____ 91.73
Viscosity index _____ 102.7
Flash point, Cleveland open cup _____ ° F__ 450

Base oil No. 3

This oil is an SAE 30 grade solvent refined mid-continent base stock having the following properties:

Viscosity at 100° F _____ SUS__ 547
Viscosity at 210° F _____ do____ 66.3
Pour point _____ ° F__ −20

Base oil No. 4

This oil is a low aromatic, solvent refined, mid-continent base stock.

Base oil No. 5

This oil is an SAE 30 grade solvent refined mid-continent base stock having the following properties:

Viscosity at 100° F _____ centistokes__ 114.7
Viscosity at 210° F _____ do____ 11.68
Viscosity index _____ 97.5

Table I below is a description of the alcohols which were used in esterifying the various copolymers described herein. The first three alcohols are mixtures of straight-chain alcohol having the composition set forth in the table. The next three alcohols are of oxo origin and so are branched chain alcohols having carbon chain lengths as described.

TABLE I.—ALCOHOLS, PERCENT

| No. | $C_{10}$ | $C_{12}$ | $C_{14}$ | $C_{16}$ | $C_{18}$ |
|---|---|---|---|---|---|
| 1 | 3.0 | 65.7 | 20.2 | 10.6 | 0.5 |
| 2 | 2.6 | 61.0 | 23.0 | 11.2 | 2.2 |
| 3 | 2.5 | 55.5 | 21.0 | 10.2 | 10.8 |
| 4 | Oxotridecyl (100% $C_{13}$). | | | | |
| 5 | Oxo $C_{16}$ (100% $C_{16}$). | | | | |
| 6 | Oxo $C_{20}$ (100% $C_{20}$). | | | | |
| 7 | Tallow 18.0%/Oxotridecyl 82.0.[1] | | | | |

[1] Tallow alcohol is a mixture of about 33% by weight of $C_{16}$ and about 67% by weight of $C_{18}$ straight-chain alkyl alcohols.

of the invention which have been experimentally prepared. These additives were prepared in similar equipment and in a manner similar to that described in Example 1, except that in some cases smaller batches were prepared. It should be noted that the properties of the product of Example 1 are also shown in this table for the blended sample of the two batches of Example 1. Examples 2 and 3 described the preparation of higher molecular weight ethylene-maleic anhydride copolymer and this material was used in Examples 14–16 to prepare the finished additives of these examples. Examples 28–32 are described in more detail subsequent to Table II with reference to Examples 26 and 27.

TABLE II.—EXPERIMENTAL EXAMPLES

| Ex. No. | Sp. Visc. of EMA | Alcohol | Percent Additive in Oil-Additive Mix | Percent Nitrogen | Ester/Imide ratio, percent COOH reacted | Acid No. |
|---|---|---|---|---|---|---|
| 1 | 0.1 | 1 | 50 | 1.36 | 62/38 | 1.08 |
| 4 | 0.1 | 1 | 50 | 1.77 | 54/46 | 1.60 |
| 5 | 0.1 | 1 | 100 | 2.51 | 65/35 | |
| 6 | 0.1 | 1 | 50 | 0.88 | 73/27 | 1.13 |
| 7 | 0.1 | 1 | 50 | 1.15 | 67/33 | 1.05 |
| 8 | 0.1 | 1 | 50 | 0.56 | 82/18 | 0.54 |
| 9 | 0.1 | 1 | 50 | 0.29 | 90/10 | 2.96 |
| 10 | 0.1 | 1 | 50 | 0.81 | 75/25 | 1.07 |
| 11 | 0.1 | 5 | 50 | | 70/30 | |
| 12 | 0.1 | 6 | 50 | | 70/30 | |
| 13 | 0.1 | 1 | 50 | 0.55 | 82/18 | 1.80 |
| 14 | 0.624 | 3 | 33 | 0.20 | 90/10 | |
| 15 | 1.11 | 4 | 40 | 0.37 | 85/15 | 3.05 |
| 16 | 1.11 | 4 | 33 | 0.58 | 73/27 | 3.00 |
| 17 | 0.1 | 2 | 40 | 0.64 | 75/25 | |
| 18 | 0.1 | 1 | 100 | 2.93 | 60/40 | |

| Ex. No. | Sp. Visc. of SMA | Alcohol | Percent Additive in Oil-Additive Mix | Percent Nitrogen | Ester/Imide ratio, percent COOH reacted | Amine ratio, percent COOH reacted A | B |
|---|---|---|---|---|---|---|---|
| 28 | 0.85 | 7 | 37 | | 89.0/11.0 | 12.0 | |
| 29 | 0.80 | 7 | 37 | 0.36 | 88.3/11.7 | 5.8 | 5.9 |
| 30 | 0.80 | 7 | 37 | | 88.4/11.6 | 3.7 | 7.9 |
| 31 | 0.80 | 7 | 37 | 0.27 | 88.3/11.7 | 3.5 | 8.2 |
| 32 | 0.80 | 7 | 37 | | 89.3/10.7 | 3.2 | 7.5 |

Note.—A = Dimethylaminopropylamine; B = "Armeen HT" which is a mixture of straight primary amines having 25% hexadecyl, 70% octadecyl and 5% octadecenly amine; SMA = Styrene/maleic anhydride copolymer.

EXAMPLE 2

This is a description of the preparation of an ethylene-maleic anhydride copolymer having a specific viscosity of 0.624. This copolymer was prepared in a similar manner and in similar equipment to the 0.1 specific viscosity copolymer, preparation of which is described in Example 1. The raw materials charged to the reactor were 375 pounds of ethylene dichloride, 60 pounds of maleic anhydride, and 1.46 pounds of benzoyl peroxide. Ethylene was charged during the reaction to maintain a pressure of 285 p.s.i.g. at a reaction temperature of 60° C., and the total reaction time was 19 hours. It should be noted that no chain stopper material was charged in making this copolymer since a higher molecular weight copolymer was desired. As stated, the copolymer product had a specific viscosity of 0.624.

EXAMPLE 3

This example describes the preparation of 1.11 specific viscosity ethylene-maleic anhydride copolymer. This copolymer was prepared in a similar manner and in similar equipment to that used to make the 0.1 specific viscosity copolymer of Example 1. The raw materials charged to the reactor were 375 pounds of ethylene dichloride, 50 pounds of maleic anhydride, and 2 pounds of 2,4-dichlorobenzoyl peroxide catalyst. No chain stopper was used in making this copolymer since a higher molecular weight copolymer was desired. Ethylene was charged to the reactor to maintain a pressure of 285 p.s.i.g. at 40° C., and the reaction time was 29 hours. As stated, the copolymer had a specific viscosity of 1.11.

The following Table II is a summary of the properties of a number of ethylene-maleic anhydride ester-imides

EXAMPLE 19

This example describes supplemental treatment of the blended product of Example 1 for the purpose of improving the odor and reduce the acid number thereof. To 300 grams of the blended product of Example 1 having an acid number of 1.08 was added 0.4 gram of 85% KOH which had been dissolved in 20 ml. of butanol. This mixture plus 100 ml. of xylene was refluxed for ½ hour at 160° C., stripped at 180°/15 mm. of Hg to remove the xylene, and filtered to give a clear copolymer concentrate. The acid number of this treated sample was 0.14, the odor subtantially better than the original, and the product was only slightly darker in color than the original.

EXAMPLE 20

This example describes an attempt to improve the odor and reduce the acid number of the blended product of Example 1 by blowing with nitrogen at increased temperature. A sample of 400 grams of the blended product of Example 1 having an acid number of 1.08 was charged to a flask equipped with a reflux condenser along with 100 ml. of xylene. The contents of the flask were refluxed at 160° C. for 45 minutes with a strong stream of nitrogen flowing through the reaction mixture. The nitrogen blowing was continued through the stripping operation to remove the xylene at 195°/15 mm. of Hg and the blowing was continued for an additional 15 minutes at 190° C. after the removal of the xylene. The filtered treated product had an acid number of 0.981 which is not appreciably lower than the untreated sample. Although the odor was improved some over the orginal untreated sample, it was not as good as the KOH treated sample of Example 19.

EXAMPLE 21

This example describes an attempt to improve the odor and reduce the acid number of the blended product of Example 1 by blowing at increased temperatures with carbon dioxide. A sample of 400 grams of the blended product of Example 1 and 100 ml. of xylene were refluxed at 160° C. for 45 minutes with a strong $CO_2$ stream being blown through the sample. The $CO_2$ blowing was continued throughout the stripping operation to remove the xylene at 195° C./15 mm. of Hg and after the xylene removal the blowing was continued at 190° C. for 15 additional minutes. The treated sample was filtered and had an acid number of 0.953, which is not appreciably lower than the untreated sample. The odor of the sample was better than the nitrogen blown sample but was not as good as the treated sample of Example 19. It, therefore, appeared that the KOH treatment is preferred over the nitrogen or $CO_2$ blowing treatment.

EXAMPLE 22

In a manner similar to that described in Example 19, a 1-gallon sample of KOH treated blended product of Example 1 was prepared. The odor of the treated sample was much improved over the untreated sample and the acid number was reduced to 0.23. This treated sample was prepared for additional detergency test work.

EXAMPLE 23

This example describes the KOH treatment of a 1 gallon sample of a product of Example 4 for use in detergency tests. The sample was treated in a manner similar to that described in Example 19 resulting in the reduction of the acid number from 1.60 to 0.29. The odor was much improved over the untreated sample.

EXAMPLE 24

This example describes the preparation of a propylene-maleic anhydride copolymer product. A 3-liter stainless steel autoclave was charged with 196 g. (2 mols) of maleic anhydride, 1600 ml. of toluene, and 7.27 g. of benzoyl peroxide. The autoclave was then pressured with propylene (65 g.) to a pressure of 40 p.s.i.g. at 80° C. The reaction was maintained at 80° C. and 40 p.s.i.g. for 18 hours, during which time 72 grams of additional propylene were added. The reaction slurry was then filtered, washed with benzene, and dried in vacuum to give 281 g. of propylene-maleic anhydride copolymer having a specific viscosity of 0.13. Two additional runs were made in a similar manner to obtain additional products. In one of these other batches 270 g. of 0.124 specific viscosity material was prepared and in the second 0.08 specific viscosity copolymer was prepared of which 20 g. was used.

A mixture was made of the 3 different propylene-maleic anhydride copolymers prepared above as follows: 270 g. of the 0.130 specific viscosity material, 270 g. of the 0.124 specific viscosity material, 20 g. of the 0.08 specific viscosity material to make a total of 560 g. (4 mols) of propylene-maleic anhydride copolymer. To this 560 grams was added 1600 g. (8 moles) of alcohol No. 1, 150 ml. of xylene, and 3 g. of toluene sulfonic acid catalyst. These materials were charged to the flask of equipment similar to that used to prepare ethylene-maleic anhydride copolymer in Example 1. Heating and stirring of the flask contents was begun and the solid raw materials were put into solution in about 1 hour, when the pot temperature reached about 160° C. Heating was continued over a period of about 4½ hours with the temperature being raised gradually from 160° C. to 200° C. after which time the flask and contents were allowed to cool. To the material in the flask was then added 1.6 mols (163.2 g.) of N,N-dimethyl-1,3-propylenediamine. The reaction of this mixture was carried on in the usual manner over a period of about 12 hours with the temperature in the flask raising from about 156° C. to 167° C. Water was removed as formed, and after the reaction was complete the solvent was stripped off to yield 1460 g. of product. A small sample of the pure additive was removed, after which the additive was diluted to 50% concentration with base oil No. 1. This diluted product was filtered to give a clear concentrate, 1.45% nitrogen equivalent to 60% ester and 40% substituted imide content.

EXAMPLE 25

This example describes the preparation of an isobutylene-maleic anhydride copolymer product. The copolymer itself was prepared in a manner similar to that described in Example 1 for ethylene-maleic anhydride copolymer. To a 300 gallon steel kettle fitted with a heating jacket 1690 pounds of benzene, 134 pounds of maleic anhydride, 141 pounds of isobutylene, and 1.7 pounds of benzoyl peroxide were charged. The polymerization was carried out at a temperature of 54–56° C., and a pressure of 5–10 p.s.i.g. for 6.7 hours to give about 60% conversion and at a temperature of about 69° C. for 2 hours to give substantially 100% conversion. The polymer slurry was dried over a period of about 15.8 hours in a 300 gallon Stokes Rotary Vacuum Dryer at a temperature of 78–87° C. to give a dried product of 195.25 pounds.

In a similar manner to that described in Example 1 and using similar equipment, an additive was prepared from the isobutylene-maleic anhydride copolymer described above. To the flask were charged 15.4 g. of (0.1 mol) of the isobutylene-maleic anhydride copolymer, 27.8 g. (0.085 mols) of the $C_{14}$–$C_{18}$ oxypropylamine, 1.53 g. (0.015 mol) of N,N-dimethyl-1,3-propylenediamine and 150 g. of base oil No. 3. The $C_{16}$–$C_{18}$ alkyl oxy propylamine was prepared by cyano-ethylation of "Makanol No. 2" (a mixture of alcohols containing 6% $C_{14}$, 28% $C_{16}$ and 66% $C_{18}$ fatty alcohols) followed by reduction of the nitrile to the amine. This reaction mixture was heated and stirred at 200° C. for two hours, then an additional 2.04 g. of the polyamine was added and the reaction was continued for an additional 1¾ hours. During this time 1.7 ml. of water were removed and 21.6 g. of oil was added to give a 20% polymer product concentration. The product analyzed for 0.87% nitrogen.

EXAMPLE 26

This example describes a typical preparation of a styrene/maleic anhydride copolymer. A sample of 98 g. (1 mole) of maleic anhydride was dissolved in a mixture of 1605 ml. of benzene and 595 ml. of xylene, and the solution was heated to 75° C. To the maleic anhydride solution was added 104 g. (1 mole) of styrene containing 0.242 g. of benzoyl peroxide, and the mixture was stirred continuously over a period of two hours while maintaining the temperature between 75° and 80° C. Stirring of the reaction mixture was continued for an additional three hours (total reaction time 5 hours). The insoluble copolymer was filtered from the liquid medium, washed thoroughly with benzene and dried in a vacuum oven to give 190 g. of polymer having a specific viscosity of 1.047 (1% polymer in dimethyl formamide at 25° C.) by varying the benzene to xylene ratio products of varying specific viscosity can be obtained. Thus, when 1760 ml. of benzene plus 440 ml. of xylene was used the specific viscosity of the product was 1.196 and when 1475 ml. of benzene plus 725 ml. of xylene was used in the same general procedure as described before, the resulting specific viscosity of the product was 0.868. The products of Examples 28–32 were made from styrene/maleic anhydride copolymer made in a similar manner to the copolymer of Example 26.

EXAMPLE 27

This example describes a general preparation for an additive of the invention from styrene/maleic anhydride copolymer. A sample of 505 g. of styrene/maleic anhydride copolymer (such as that described in Example 26) was slurried in 1500 g. of xylene, 817 g. of oxotridecyl alcohol, 238 g. of tallow alcohol and 10 g. of toluene sulfonic acid catalyst. This mixture was heated with stirring at 160° C. for 14 hours while the water of reaction was removed as a xylene azeotrope. At the end of this period the percent esterification was 88.5% by acid number. The mixture was cooled slowly to 50–75° C. and diluted with 435 g. of xylene. At 85° C. a sample of 118.0 g. of "Armeen HT" was added over a 10 minute period, stirring was continued for 15 minutes and 19.2 g. of dimethylaminopropylamine was added over a 5 minute period. The temperature was raised to 160° C. over a 30 minute period removing xylene and xylene-water azeotrope. The imidification reaction was then maintained at 160° C. for 4 hours. At the end of this time 750 g. of base oil No. 1 is added to the reaction mixture and the mixture is stripped of xylene and unused alcohols for 10 minutes at 155° C./20–30 mm., followed by 2 hours at 165° C./1–3 mm. Then to the stripped reaction mixture was added 1796 g. of base oil No. 1 to bring the material to a 37% polymer concentrate based on total recovered product. The total recovered product was 1494 g. and the total concentrate was 4040 g. The polymeric additive concentrates of Examples 28–32 were made in a similar manner as the concentrate of Example 27.

Table III below sets forth data of the testing of the additives of the invention in a carbon black dispersion test. This method tests the ability of the additives to hold carbon black dispersed in kerosene. The testing is carried out both in the presence of and in the absence of water since some additives tend to leach out and become ineffective in the presence of water. A carbon black concentrate is made up to 15% by weight carbon in a highly refined mineral, white oil. One gram of this carbon oil paste is added to a 25 by 150 mm. culture test tube with a plastic closed top, and to the flask are then added 30 g. of kerosene. Thus, the concentration of carbon based on the kerosene presence is 0.5% by weight. Then 0.5% by weight based on the active ingredients present of the various detergents to be tested are weighed into separate test tubes, containing the kerosene and carbon black. The test tube is sealed and the ingredients dispersed by 15 minutes of shaking by hand. To the test, wherein water is present, 1 volume percent of water (about 0.3 ml.) is added to the other ingredients in the test tube. The test tubes after being thoroughly agitated are placed in a rack and observations of the degree of settling are made periodically. The results in Table III are reported in the time for complete settling, the time when partial settling was observed, or the number of days that the testing was run before it was terminated when no settling was observed. In some cases the amount of the detergent additive was reduced in an attempt to find the lower limits of effectiveness of additive but in no cases involving the additives of the invention was the concentration of the additives sufficiently reduced, so the carbon black would settle out. The tests were conducted at room temperature.

TABLE III.—CARBON BLACK DISPERSION

| Additive | Weight, Percent | Time for Carbon Black to Settle— no Water Present | Time for Carbon Black to Settle— 1% by Volume of Water Added |
|---|---|---|---|
| None | | 15–30 minutes | 15–30 minutes. |
| High temp. Detergent | 0.5 | 1 day | 2 days. |
| Example 15 | 0.5 | P.S. in 2 days [1] | |
| Do | 2.0 | do | |
| Example 16 | 0.5 | do | |
| Do | 2.0 | do | |
| Example 11 | 0.5 | 1 day | |
| Example 12 | 0.5 | do | |
| Example 1 | 0.5 | N.S. in 56 days | N.S. in 56 days. |
| Example 4 | 0.5 | do | Do. |
| Example 5 | 0.5 | N.S. in 14 days | |
| Example 13 | 0.5 | do | |
| Example 14 | 0.5 | N.S. in 56 days | Do. |
| Example 17 | 0.5 | N.S. in 14 days | |
| Do | 0.25 | do | |

TABLE III.—Continued

| Additive | Weight, Percent | Time for Carbon Black to Settle— no Water Present | Time for Carbon Black to Settle— 1% by Volume of Water Added |
|---|---|---|---|
| Example 18 | 0.5 | do | |
| Example 17 | 0.5 | do | N.S. in 14 days. |
| Do | 0.08 | do | Do. |
| Example 10 | 0.5 | do | Do. |
| Do | 0.08 | do | Do. |
| Example 8 | 0.5 | do | Do. |
| Do | 0.08 | do | Do. |
| Example 9 | 0.5 | do | Do. |
| Do | 0.08 | do | Do. |
| Example 6 | 0.5 | do | Do. |
| Do | 0.08 | do | Do. |
| Example 24 | 0.5 | do | |
| Example 25 | 0.5 | do | |

[1] N.S.=means not settled; P.S.=means partially settled.

It is noted in Table III that from about 15 to 30 minutes are all the time that is required for the carbon black to settle out of the kerosene in which no dispersant additive is contained. It is quite interesting to note that the one, a high temperature detergent tested, was a very poor low temperature detergent. This particular high temperature detergent was a detergent for lubricating oils in commercial use. It was a barium salt of an alkyl phenol sulfide dissolved in oil probably in about 50%. It is interesting to note that the mere fact that an additive is a good high temperature detergent is no indication that it will have good low temperature detergency properties. Other than in the case of the high temperature detergent the concentrations of additives are reported in Table III on the basis of active ingredients rather than oil concentrate added. It may also be concluded from examining the data wherein the additives of Examples 11, 12, 15 and 16 were used that the use of branched-chain alcohols rather than straight-chain alcohols in making the additives cause the production of poor low temperature detergent additives. The oxo alcohols are branched-chain alcohols. The other experiments on additives of the invention indicate that these additives would be effective as low temperature detergents for an indefinitely long time. The concentrations of these additives of the invention were not reduced low enough for them to show any decrease in efficiency, but it was indicated that they would be effective at very low concentrations.

Table IV below reports the testing of an addition of the invention in a fuel oil screen clogging test. In this test a domestic fuel oil pump with a self-contained 100 mesh Monel strainer is used. A synthetic sludge made by blending lampblack, water and No. 2 fuel oil is made and a measured amount of this sludge is stirred into each sample of fuel oil to be tested along with dispersant additives, if any. A measured amount of the doped fuel is then run through the fuel pump and strainer and the amount of deposits retained on the strainer is measured to determine the effectiveness of the dispersant. Not more than 40 mg. of deposits retained on the filter per liter of fuel oil pumped through the filter is a passing test.

TABLE IV.—FUEL OIL SCREEN CLOGGING TEST

| Run No | 1 | 2 | 3 | 4 | 5 | 6 |
|---|---|---|---|---|---|---|
| Base Fuel Oil No | 1 | 1 | 1 | 2 | 2 | 2 |
| Low Temp. Det., lbs./1,000 bbl | 0 | 5 | 15 | 0 | 5 | 15 |
| Screen Clogging mg./liter | 217.1 | 51.0 | 8.2 | 231.1 | 43.8 | 9.8 |

The data in Table IV demonstrates the effectiveness of the additive of Example 7 in eliminating fuel oil filter screen clogging. Since the additive was incorporated into the fuel oil as a 50% concentrate, the actual amount of active ingredients in the fuel oil of the dispersant are one-half that shown in the table. The data speaks for itself in demonstrating the dispersing ability of the new additives. Two different types of base fuel oil were used, No. 1 being an "X" grade distillate fuel oil and No. 2 being a blend of about 40% straight run distillate and 60% cracked distillate.

Table V below reports low temperature detergency tests on the additives of the invention. The testing procedure used was the standard FL-2 as used by industry, which test is described as "Research Technique for Determining Effects of Fuels and/or Lubricants or Formation of Engine Deposits." The equipment used is a Chevrolet engine as used in the L-4 test with certain modifications to adapt the equipment to operate at the low temperatures desired for the FL-2 test. The L-4 test and equipment is described in detail in the 1946 edition of the "CRC Handbook" beginning on page 394. The major chain in the L-4 equipment for the FL-2 test is the addition of special cooling systems for the jacket and oil pan capable of maintaining the required low temperatures. The coolant temperature is maintained at 85° F.±2°. inlet and 95° F.±5° outlet, and the oil sump temperature is maintained at 165° F.±5°. The duration of the test is 40 hours after a one-hour run-in test. At the end of 10, 20 and 30 hours of test the engine is shut down to measure oil level and add oil if the level is down, and at the end of 10 and 30 hours the engine is shut down for 4 hours and allowed to cool off. After each shutdown period the engine is brought up to speed, load and operating conditions in a 30 minute run-in period. After the test is finished the engine is carefully dismantled, taking care not to disturb any deposits. Various parts of the engine are then examined for sludge deposits and comparison is made according to standards and rating described in the "Coordinating Research Council (CRC) Deposit Rating Scale." The first eight engine area ratings in Table V are used in determining total rating, i.e., this does not include cylinder block and timing gear cover ratings. Each area is rated on a scale of 1 to 10 with 10 being the highest, indicating the area contains substantially no deposits. In the total rating then the basis is adjusted to the 0–100 scale.

in some runs was a commercial additive made by copolymerizing methyl methacrylate and "Lorol" methacrylate which is made by esterifying methacrylic acid with a mixture of $C_{10}$ to $C_{18}$ straight-chain alcohols.

The test results shown in Table V show the testing of the detergency additives of the invention in engine tests wherein the test oil contains, in addition to the low temperature detergent being tested, a conventional oxidation inhibitor customarily used in lubricating oils as well as certain other additives in some of the tests such as conventional high temperature detergents and viscostiy index (V.I.) improvers. Normally the V.I. improver is also a pour point depressant. The percent concentration of the low temperature detergent additive relates to the pure additive and not to the oil concentrate; whereas other additive concentrations are on the basis of an oil concentrate of the additive. All concentrations are percent by weight based on the base oil unless otherwise indicated. For comparison tests are also made with the base oil alone, the base oil plus the oxidation inhibitor, and the base oil plus high temperature detergent and V.I. improver as well as oxidation inhibitor. These tests indicate that the new low temperature detergent additives improve the low temperature detergency of the base oil very substantially at relatively low concentrations. The test data also indicate that the high temperature detergent has no substantial low temperature detergency properties. It is further indicated that the novel additives of the invention are compatible with the high temperature detergent and improve the low temperature detergency of an oil in which they are both present. Total ratings of over 90% are attained in the tests using the low temperature detergency additives and this is excellent, being a commercially satisfactory performance.

In Table VI are set forth data obtained from testing the novel additives in high temperature oxidation

TABLE V.—LOW TEMPERATURE DETERGENCY TESTS

| Run No | 1 | 2 | 3 | 4 | 5 | 6 | 7 | 8 | 9 | 10 | 11 | 12 |
|---|---|---|---|---|---|---|---|---|---|---|---|---|
| Base Oil No | 3 | 3 | 3 | 3 | 3 | 3 | 3 | 3 | 3 | 3 | 3 | 3 |
| Low Temp. Det.: | | | | | | | | | | | | |
| Example No | | 14 | 14 | 16 | 17 | 17 | 9 | 7 | 7 | 1 | 22 | |
| Percent | | 1.25 | 1.25 | 1.25 | 0.625 | 1.25 | 1.25 | 0.625 | 1.25 | 0.625 | 0.625 | |
| Oxidation Inhibitor, percent | 0.68 | 0.68 | 0.68 | 0.68 | 0.68 | 0.8 | 0.68 | 0.68 | 0.68 | 0.68 | 0.68 | |
| High Temp. Det., percent | | | | | | | | | | | | |
| V. I. Improver, percent | | | | | | | | | | | | |
| Ratings: | | | | | | | | | | | | |
| Total | 60.2 | 73.9 | 87.3 | 86.1 | 68.1 | 80.6 | 86.9 | 88.0 | 88.8 | 90.1 | 94.5 | 91.1 |
| No. 1 Piston | 4.1 | 3.5 | 6.6 | 7.0 | 6.0 | 7.0 | 7.2 | 6.8 | 7.2 | 7.9 | 8.5 | 8.1 |
| Average Piston | 6.5 | 6.3 | 8.1 | 8.7 | 6.6 | 8.6 | 8.9 | 7.5 | 8.4 | 9.0 | 9.6 | 9.0 |
| No. 1 Ring | 2.0 | 8.0 | 10.0 | 9.0 | 9.5 | 9.5 | 9.2 | 9.8 | 10.0 | 9.5 | 10.0 | 10.0 |
| Average Ring | 7.6 | 9.6 | 10.0 | 9.8 | 8.9 | 9.7 | 9.8 | 9.9 | 10.0 | 9.9 | 10.0 | 10.0 |
| Oil Screen | 9.0 | 9.5 | 9.5 | 9.4 | 3.5 | 9.6 | 9.3 | 9.4 | 9.5 | 9.0 | 9.8 | 9.5 |
| Top Deck | 4.6 | 7.0 | 9.0 | 9.0 | 7.2 | 5.6 | 8.3 | 9.0 | 9.0 | 9.0 | 9.0 | 8.4 |
| Push Rod Cover | 5.9 | 6.2 | 7.7 | 7.0 | 6.2 | 6.4 | 7.8 | 8.5 | 8.7 | 8.8 | 9.5 | 9.0 |
| Oil Pan | 8.5 | 9.0 | 8.9 | 9.0 | 6.6 | 8.1 | 9.0 | 9.5 | 8.1 | 9.0 | 9.2 | 9.0 |
| Cylinder Block | 3.5 | 2.8 | 5.1 | | 8.1 | 3.4 | 7.5 | 7.2 | 4.8 | 6.5 | 9.0 | 7.8 |
| Timing Gear Cover | | | | | 7.0 | 7.5 | 8.1 | 8.9 | 9.0 | 8.6 | 9.5 | 9.5 |

| Run No | 13 | 14 | 15 | 16 | 17 | 18 | 19 | 20 | 21 | 22 | 23 |
|---|---|---|---|---|---|---|---|---|---|---|---|
| Base Oil No | 3 | 3 | 4 | 4 | 4 | 4 | 5 | 5 | 5 | 5 | 5 |
| Low Temp. Det.: | | | | | | | | | | | |
| Example No | 4 | 23 | | 7 | 7 | 7 | 28 | 29 | 30 | 31 | 32 |
| Percent | 0.625 | 0.625 | | 0.625 | 1.25 | 0.625 | 0.74 | 0.74 | 0.74 | 0.74 | 0.74 |
| Oxidation Inhibitor, percent | 0.68 | 0.68 | 0.90 | 0.90 | 0.90 | 0.90 | 0.95 | 0.95 | 0.95 | 0.95 | 0.95 |
| High Temp. Det., percent | | | 6.1 | 6.1 | 6.1 | | | | | | |
| V. I. Improver, percent | | | 4.1 | 4.1 | 4.1 | | | | | | |
| Ratings: | | | | | | | | | | | |
| Total | 96.2 | 89.0 | 72.8 | 79.4 | 80.3 | 84.7 | 88.4 | 87.2 | 88.1 | 89.9 | 81.9 |
| No. 1 Piston | 9.5 | 8.7 | 2.2 | 3.7 | 4.0 | 5.7 | 8.0 | 7.7 | 7.7 | 7.5 | 6.5 |
| Average Piston | 9.8 | 9.4 | 3.9 | 4.7 | 5.2 | 7.1 | 9.0 | 9.1 | 8.8 | 8.9 | 8.4 |
| No. 1 Ring | 10.0 | 9.0 | 9.5 | 9.5 | 10.0 | 10.0 | 10.0 | 10.0 | 10.0 | 10.0 | 8.8 |
| Average Ring | 10.0 | 9.8 | 9.4 | 9.8 | 10.0 | 10.0 | 10.0 | 10.0 | 10.0 | 10.0 | 9.8 |
| Oil Screen | 9.9 | 9.2 | 9.2 | 9.0 | 9.5 | 9.8 | 9.8 | 10.0 | 9.7 | 10.0 | 9.3 |
| Top Deck | 9.4 | 8.4 | 8.6 | 9.2 | 8.5 | 9.0 | 8.8 | 7.5 | 8.3 | 9.2 | 8.0 |
| Push Rod Cover | 9.2 | 8.7 | 7.6 | 9.0 | 9.0 | 9.0 | 8.1 | 7.7 | 7.9 | 7.8 | 6.8 |
| Oil Pan | 9.2 | 8.0 | 7.9 | 8.6 | 8.0 | 8.0 | 7.5 | 7.8 | 8.1 | 6.7 | 8.0 |
| Cylinder Block | 9.3 | 7.5 | 6.5 | 8.7 | 8.8 | 9.0 | 5.3 | 4.5 | 7.5 | 8.5 | 5.1 |
| Timing Gear Cover | 9.5 | 9.0 | 8.5 | 9.0 | 8.5 | 9.0 | 8.0 | 7.9 | 7.6 | 8.0 | 5.5 |

The oxidation inhibitor used in all the tests, except run No. 4, was a commercially available additive which was the zinc salt of a dialkyl dithiophosphoric acid. The oxidation inhibitor of run No. 4 was a commercial additive which was an alpha-pinene and $P_2S_5$ reaction product. The high temperature detergent used in some of the last runs of the table was a commercially available additive containing barium sulfonate. The V.I. improver used and high temperature detergency engine tests. The high temperature oxidation test is known in the art as the L-4 test, and it is described in detail as the L-4-545 test in the "CRC Handbook" of 1946 edition as "Test Procedure for Determining Oxidation Characteristics of Heavy Duty Crankcase Oils." The high temperature detergency test is shown as the L-1 test and it too is described in detail as the L-1-545 test in this same "CRC Handbook." The L-1 Test is adapted from and essentially equivalent to the 480 hour test No. 1-A described in the "Diesel Lubricant Test Manual" of the Caterpillar Tractor Company. The L-1 test is titled "Test Procedure for Determining in an Engine the Effect of Engine Oils on Ring-Sticking, Wear and the Accumulation of Deposits."

TABLE VI.—HIGH TEMPERATURE OXIDATION AND DETERGENCY TESTS [1]

| Run No. | 1 | 2 | 3 |
|---|---|---|---|
| Low Temperature Detergent: | | | |
| Example No. | 7 | 7 | 4 |
| Percent | 0.625 | 0.625 | 0.625 |
| Oxidation Inhibitor, Percent | 0.9 | 0.9 | 0.9 |
| High temperature Detergent, Percent | 6.1 | | |
| V.I. Improver, Percent | 4.1 | 4.1 | 4.1 |
| Oxidation Tests | | | |
| Piston Varnish | 9.6 | 9.4 | 9.4 |
| Total Rating | 95.1 | 93.2 | 94.0 |
| Bearing Wt. Loss, Total Mg | 54.7 | 99.7 | 74.9 |
| Bearing Appearance | ([2]) | ([3]) | ([4]) |
| Detergency Test | | | |
| Mil Carbon | 0.15 | | |
| Mil Lacquer | .09 | | |
| Percent Carbon Filling Top Groove | 16 | | |
| Total Rating | 98.34 | | |

[1] The base oil used in tests was base oil No. 4.
[2] Excellent.
[3] Bluing.
[4] Blued.

The oxidation inhibitor used in the tests of Table VI was the same one used in all but one of the tests of Table V, and the high temperature detergent and V.I. improver were the same additives used in the tests of Table V. The conclusions that can be drawn from the L-4 oxidation tests in Table VI are that the low temperature detergent additive of the invention can be formulated in a compatible fashion with other lubricant additives to give an engine oil which will qualify in the L-4 test. One hundred percent would be a perfect total rating. All three of the tests shown in Table VI above are passing. It should be noted that the oil qualifies with or without the high temperature detergent additive present.

The interesting conclusion to be reached from the L-1 high temperature detergency test in Table VI is that not only are the additives of the invention good low temperature detergents but good high temperature detergents as well. This is quite surprising since the high temperature detergent tested in the FL-2 low temperature detergency test proved to be very poor as a low temperature detergent. The high temperature detergency test shown in Table VI is a passing test with 100% total rating being a perfect rating.

Table VII which follows demonstrates the viscosity index improving qualities of several additives of the invention. The example numbers of this table indicate the source of the polymer concentrate from the examples described hereinabove. The percentage polymer concentration in oil indicates the true percentage of the polymer itself and not of the polymer concentrate.

table, base oil No. 2 without a pour depressant additive has a pour point of +25° F. The data indicates that the copolymer esters of the invention are good pour point depressant additives.

TABLE VIII.—POUR POINT DEPRESSANT

| Example No. | Ester/Imide Ratio | Concentration of Copolymer Ester, Percent | ASTM Pour ° F. |
|---|---|---|---|
| Base Oil No. 2 | | | +25 |
| 7 | 66/34 | 0.05 | 15 |
| | | 0.10 | −5 |
| | | 0.25 | −15 |
| | | 0.50 | −20 |
| 10 | 74/26 | 0.05 | −10 |
| | | 0.10 | −5 |
| | | 0.25 | −5 |
| | | 0.50 | −15 |
| 8 | 82/18 | 0.05 | 5 |
| | | 0.10 | 0 |
| | | 0.25 | −10 |
| | | 0.50 | −5 |
| 9 | 90/10 | 0.05 | −5 |
| | | 0.10 | −5 |
| | | 0.25 | −5 |
| | | 0.50 | −15 |
| 22 | 62/38 | 0.05 | 15 |
| | | 0.10 | −5 |
| | | 0.25 | −20 |
| | | 0.50 | −15 |
| 23 | 54/46 | 0.05 | 20 |
| | | 0.10 | 20 |
| | | 0.25 | −10 |
| | | 0.50 | −15 |

The polymeric additives of the invention are effective when used in very small amounts, to improve the properties of either fuel oils or lubricating oils. Concentrations as low as 0.001% to 0.01% by weight is sufficient to improve fuel oils with respect to screen clogging, water leaching, color deterioration, asphaltene formation and the like. Larger amounts of 1% or higher could, of course, be used but normally won't be required. When the additive is used to improve the detergency of lubricating oils, the amount can vary from about 0.01% to about 10% by weight of the oil composition, and preferably from about 0.1% to about 5%.

In addition to the polymeric additives of this invention, auxiliary additives can be used in conjunction with the fuel oil or lubricating oil compositions. Such additives include fuel oil color stabilizers such as alkyl amines, e.g., tri - n - butylamine or 2,4,6 - tri(dimethylaminomethyl) phenol; metal diactivators, e.g., N,N-disalicyladene 1,2-diaminopropane; anti-oxidant, corrosion inhibitors, and the like. The oil additives include pour point and viscosity index modifiers such as the Acryloid polymers, anti-foaming agents such as silicone polymers, corrosion, friction and oxidation inhibitors, e.g., alkyl phenols, allophanates, alkyl phosphates, and salts thereof, blooming agents and the like. The polymeric additives can also be used supplementary to high temperature detergents, such as for example barium sulfonates, barium $P_2S_5$ hydrocarbon reaction product, etc. These auxiliary additives may be used in amounts varying from about 0.05% to about 5% by weight or higher.

TABLE VII.—VISCOSITY INDEX (V.I.) IMPROVEMENT

| Example No. | Kinematic Viscosity, Centistokes Polymer Concentration in Oil [1] | | | | | | V.I. Polymer Concentration on Oil | | |
|---|---|---|---|---|---|---|---|---|---|
| | 1% | | 2% | | 3% | | 1% | 2% | 3% |
| | 100° F. | 210° F. | 100° F. | 210° F. | 100° F. | 210° F. | | | |
| 14 | 121.44 | 14.06 | 158.09 | 18.85 | 202.32 | 24.29 | 117.6 | 126.2 | 129.4 |
| 15 | 117.06 | 13.55 | 147.57 | 17.22 | 182.89 | 21.55 | 116.4 | 123.2 | 127.3 |
| 16 | 114.62 | 13.31 | 144.51 | 16.89 | 172.90 | 20.86 | 116.1 | 124.3 | 128.2 |
| 28 | | | | | 166.34 | 19.95 | | | 127.38 |
| 29 | | | | | 146.94 | 17.72 | | | 125.89 |
| 30 | | | | | 174.45 | 21.58 | | | 129.84 |
| 31 | | | | | 154.51 | 18.68 | | | 126.88 |
| 32 | | | | | 160.15 | 18.89 | | | 125.50 |

[1] The base oil used in these tests was base oil No. 2, which has a V.I. of 102.7 without additive.

Table VIII which follows contains data showing the pour point depressant qualities of the copolymer esters of the invention. These data were obtained using base oil No. 2, and the concentrations of copolymer ester represent percentage in this base oil. As indicated in the The novel additive of the invention can have a number of other uses not previously mentioned herein. The additives of this invention in undiluted form can be added to carbon black printing ink having a hydrocarbon base to maintain the carbon black suspended in the ink. The additives can be used to suspend inert solids such as clay or barites in oil base drilling fluids. Dispersions of pigments in oil base paints or protective coating can be stabilized by the addition of the additives of the invention. Silica, flattening agents, clay extenders or fillers, titanium dioxide, etc., can be maintained dispersed in organic media for use in paper coating by the new additives. Carbon black can be stabilized in suspension in polyethylene by the additives, or in rubber latex. The additives of the invention can be used to stabilize invert (water in oil) emulsions. The additives can be used to maintain or stabilize uniform dispersions of inert materials in organosols or plastisols. The detergency effectiveness of the additives can be utilized in organic drycleaning fluids to suspend carbon black or dirt therein. Pigments can be suspended in monofilaments or fibers by the use of the additives. Additional uses for the additives are as dispersants for pigments in neoprene based cements, dispersants for household insecticides in low boiling hydrocarbons, and as dispersants for insecticides where oil in water emulsions are used. These and other related uses are some of the more important uses for the novel additives of the invention.

Although the invention has been described in terms of specified examples, which are set forth in considerable detail, it should be understood that this is by way of illustration only and that the invention is not necessarily limited thereto, since alternative embodiments will become apparent to those skilled in the art in view of the disclosure. Accordingly, modifications are contemplated which can be made without departing from the spirit of the described invention.

What is claimed is:

1. An improved hydrocarbon oil composition comprising a major amount of a hydrocarbon oil and a minor amount at least sufficient to impart stability and detergency to said hydrocarbon oil of a polymer product of a copolymer having a molecular weight in the range of about 500 to about 150,000 formed of substantially equimolar portions of maleic anhydride and an alpha-olefin selected from the group consisting of ethylene, propylene, isobutylene and styrene, the carboxyl groups of said copolymer being reacted with at least an amount sufficient to make said copolymer oil soluble but not more than about 95% with a substance selected from the class consisting of an aliphatic alcohol having between about 10 and 20 carbon atoms and an aliphatic $C_{14}$ to $C_{18}$ oxypropylamine and substantially all of the balance of the carboxyl groups being imidized with a compound of the formula

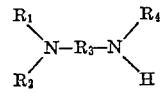

wherein $R_1$ and $R_2$ are selected from the group consisting of aliphatic hydrocarbon radicals having 1 to 4 carbon atoms and cyclohexyl radical, $R_3$ is an aliphatic hydrocarbon radical having 2 to 4 carbon atoms, and $R_4$ is selected from the class consisting of the hydrogen atom and aliphatic hydrocarbon radicals having from 1 to 4 carbon atoms.

2. The composition of claim 1, wherein said oil is a mineral lubricating oil, and said polymer product is a copolymer of isobutylene and maleic anhydride, the carboxyl groups of said copolymer being imidized to about 70% with a mixture of aliphatic $C_{14}$ to $C_{18}$ oxypropylamine, and substantially all of the balance of the carboxyl groups being imidized with N,N-dimethyl-1,3-propylenediamine.

3. An improved hydrocarbon oil composition comprising a major amount of a hydrocarbon oil and a minor amount at least sufficient to impart stability and detergency to said hydrocarbon oil of a polymer product of a copolymer having a molecular weight in the range of about 500 to about 150,000 formed of substantially equimolar portions of maleic anhydride and an alpha-olefin selected from the group consisting of ethylene, propylene, isobutylene and styrene, the carboxyl groups of said copolymer being esterified with at least an amount sufficient to make said copolymer oil soluble but not more than about 95% with an aliphatic alcohol having between about 10 and 20 carbon atoms, and substantially all of the balance of the carboxyl groups being imidized with a compound of the formula

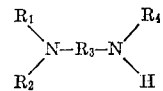

wherein $R_1$ and $R_2$ are selected from the group consisting of aliphatic hydrocarbon radicals having 1 to 4 carbon atoms and cyclohexyl radical, $R_3$ is an aliphatic hydrocarbon radical having 2 to 4 carbon atoms, and $R_4$ is selected from the class consisting of the hydrogen atom and aliphatic hydrocarbon radicals having from 1 to 4 carbon atoms.

4. The composition of claim 3, wherein said oil is a mineral lubricating oil, and said polymer product is a copolymer of ethylene and maleic anhydride, having a specific viscosity in the range of about 0.05 to about 2.0 at 1% by weight concentration in dimethylformamide at 25° C., the carboxyl groups of said copolymer being esterified from about 50% to about 80% with an aliphatic alcohol having between about 10 and about 20 carbon atoms, and substantially all of the balance of the carboxyl groups being imidized with a polyamine of the formula

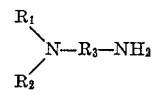

wherein $R_1$ and $R_2$ are aliphatic hydrocarbon radicals having from 1 to 4 carbon atoms and $R_3$ is an aliphatic hydrocarbon radical having from 2 to 4 carbon atoms.

5. The composition of claim 4, wherein said copolymer has a specific viscosity of about 0.1, the carboxyl groups of said copolymer are esterified to about 60% with a mixture of $C_{10}$ to $C_{18}$ aliphatic alcohols, substantially all the balance of the carboxyl groups are imidized with N,N-dimethyl-1,3-propylenediamine, and the remaining residual acidity has been substantially neutralized with potassium hydroxide.

6. The composition of claim 3, wherein said oil is a mineral lubricating oil, and said polymer product is a copolymer of styrene and maleic anhydride having a specific viscosity in the range of about 0.05 to about 2.0 at 1% by weight concentration in dimethylformamide at 25° C., the carboxyl groups of said copolymer being esterified from about 60% to about 95% with an aliphatic alcohol having between about 10 and about 20 carbon atoms, and substantially all of the balance of the carboxyl groups being imidized with a compound of the formula

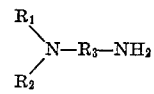

wherein $R_1$ and $R_2$ are aliphatic hydrocarbon radicals having from 1 to 4 carbons atoms and $R_3$ is an aliphatic hydrocarbon radical having from 2 to 4 carbon atoms.

7. The composition of claim 6 wherein a mixture of $C_{10}$ to $C_{18}$ aliphatic alcohols are used.

8. An improved hydrocarbon oil composition comprising a major amount of a hydrocarbon oil and a minor amount at least sufficient to impart stability and detergency to said hydrocarbon oil of a polymeric product comprising a copolymer having a molecular weight in the range of about 500 to 150,000 formed of substantially equimolar portions of maleic anhydride and an alpha-olefin selected from the group consisting of ethylene, propylene, isobutylene and styrene, the carboxyl groups of said copolymer being esterified with at least an amount sufficient to make said copolymer oil soluble but not more than about 95% with an aliphatic alcohol having between about 10 and about 20 carbons atoms, and substantially all of the balance of the carboxyl groups being imidized with a compound of the formula

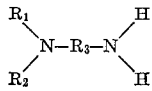

wherein $R_1$ and $R_2$ are selected from the group consisting of aliphatic hydrocarbon radicals having 1 to 4 carbon atoms and the cyclohexyl radical, and $R_3$ is an aliphatic hydrocarbon radical having from 2 to 4 carbon atoms.

9. An improved hydrocarbon oil composition comprising a major amount of hydrocarbon oil and a minor amount at least sufficient to impart stability and detergency to said hydrocarbon oil of a polymeric product comprising a copolymer having a molecular weight in the range of about 500 to 150,000 formed of substantially equimolar portions of maleic anhydride and an alpha-olefin selected from the group consisting of ethylene, propylene, isobutylene and styrene, the carboxyl groups of said copolymer being esterified with at least an amount sufficient to make said copolymer oil soluble but not more than about 95% with an aliphatic alcohol having between about 10 and about 20 carbon atoms, substantially all of the balance of the unesterified carboxyl groups being imidized and some of the esterified carboxyl groups being imidized and some of the esterified carboxyl groups being imidized with a compound of the formula

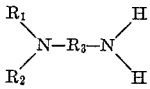

wherein $R_1$ and $R_2$ are selected from the group consisting of aliphatic hydrocarbon radicals having 1 to 4 carbon atoms and the cyclohexyl radical, and $R_3$ is an aliphatic hydrocarbon radical having from 2 to 4 carbon atoms, a total of from about 5% to about 50% of the carboxyl groups being imidized.

10. The improved hydrocarbon oil composition of claim 9 wherein said copolymer is a propylene-maleic anhydride copolymer having a specific viscosity of about 0.1 at 1% by weight concentration in dimethylformamide at 25° C. the carboxyl groups of said copolymer being esterified with a mixture of $C_{10}$ to $C_{18}$ aliphatic alcohols, and substantially all of the balance of the carboxyl groups being imidized with N,N-dimethyl-1,3-propylenediamine.

11. An improved hydrocarbon oil composition comprising a major amount of a hydrocarbon oil and a minor amount at least sufficient to impart stability and detergency to said hydrocarbon oil of a polymeric product comprising a copolymer having a molecular weight in the range of about 500 to 150,000 formed of substantially equimolar portions of maleic anhydride and an alpha-olefin selected from the group consisting of ethylene propylene, isobutylene and styrene, the carboxyl groups of said copolymer being esterified with at least an amount sufficient to make said copolymer oil soluble but not more than about 95% with an aliphatic alcohol having between about 10 and about 20 carbon atoms, substantially all of the balance of the unesterified carboxyl groups being imidized and some of the esterified carboxyl groups being imidized with a compound of the formula

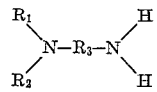

wherein $R_1$ and $R_2$ are selected from the group consisting of aliphatic hydrocarbon radicals having 1 to 4 carbon atoms and the cyclohexyl radical, and $R_3$ is an aliphatic hydrocarbon radical having from 2 to 4 carbon atoms, the portion of the esterified carboxyl groups which are imidized being substantially equal on a mole basis to the unesterified carboxyl groups which are imidized.

12. The improved hydrocarbon oil composition of claim 11 wherein said copolymer is a propylene-maleic anhydride copolymer having a specific viscosity of about 0.1 at 1% by weight concentration in dimethylformamide at 25° C., the carboxyl groups of said copolymer being esterified with a mixture of $C_{10}$ to $C_{18}$ aliphatic alcohols, and substantially all of the balance of the carboxyl groups being imidized with N,N-dimethyl-1,3-propylenediamine.

13. The composition of claim 8, wherein said oil is a mineral lubricating oil, and said polymer product is a copolymer of ethylene and maleic anhydride, having a specific viscosity in the range of about 0.05 to about 2.0 at 1% by weight concentration in dimethylformamide at 25° C., the carboxyl groups of said copolymer being esterified from about 50% to about 80%.

14. The composition of claim 13, wherein said copolymer has a specific viscosity of about 0.1, the carboxyl groups of said copolymer are esterified to about 60% with a mixture of $C_{10}$ to $C_{18}$ aliphatic alcohols, substantially all the balance of the carboxyl groups are imidized with N,N-dimethyl-1,3-propylenediamine, and the remaining residual acidity has been substantially neutralized with potassium hydroxide.

15. The composition of claim 12, wherein said oil is a mineral lubricating oil, and said polymer product is a copolymer of styrene and maleic anhydride having a specific viscosity in the range of about 0.05 to about 2.0 at 1% by weight concentration in dimethylformamide at 25° C., the carboxyl groups of said copolymer being esterified from about 60% to about 95%.

References Cited

UNITED STATES PATENTS 2,977,334  3/1961  Zopf et al.

DANIEL E. WYMAN, Primary Examiner.

W. J. SHINE, Assistant Examiner.

U.S. Cl. X.R.

44—62, 63